United States Patent
Onodera (10) Patent No.: US 11,539,385 B2
(45) Date of Patent: Dec. 27, 2022

(54) RADIO-FREQUENCY MODULE AND COMMUNICATION DEVICE

(71) Applicant: Murata Manufacturing Co., Ltd., Nagaokakyo (JP)

(72) Inventor: Syuichi Onodera, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 67 days.

(21) Appl. No.: 17/321,518

(22) Filed: May 17, 2021

(65) Prior Publication Data

US 2021/0391880 A1 Dec. 16, 2021

(30) Foreign Application Priority Data

Jun. 15, 2020 (JP) .............................. JP2020-103360

(51) Int. Cl.
*H04B 1/04* (2006.01)
*H04B 1/10* (2006.01)

(52) U.S. Cl.
CPC ......... *H04B 1/0458* (2013.01); *H04B 1/0475* (2013.01); *H04B 1/10* (2013.01)

(58) Field of Classification Search
CPC .. H04B 1/0057; H04B 1/0458; H04B 1/0475; H04B 1/10; H04B 1/16
USPC ........................................ 375/262, 295–297
See application file for complete search history.

(56) References Cited

U.S. PATENT DOCUMENTS

| 11,245,432 | B2* | 2/2022 | Farahvash | H04B 1/40 |
| 2019/0253087 | A1* | 8/2019 | Domino | H03H 7/40 |
| 2020/0007096 | A1 | 1/2020 | Kita | |
| 2020/0228151 | A1 | 7/2020 | Naniwa et al. | |
| 2021/0218370 | A1* | 7/2021 | Balteanu | H03F 3/19 |
| 2021/0391883 | A1* | 12/2021 | Onodera | H04B 1/16 |

FOREIGN PATENT DOCUMENTS

| JP | 2018-137522 A | 8/2018 |
| KR | 2020-0018624 A | 2/2020 |
| WO | 2018/168500 A1 | 9/2018 |

OTHER PUBLICATIONS

Office Action dated Mar. 28, 2022, in corresponding Korean patent Application No. 10-2021-0045597, 9 pages.

* cited by examiner

*Primary Examiner* — Emmanuel Bayard
(74) *Attorney, Agent, or Firm* — Xsensus LLP (57) ABSTRACT

A radio-frequency module includes a module substrate having a first major surface and a second major surface, a receive filter, a low-noise amplifier, an antenna switch, a first matching circuit disposed on the input side of the receive filter, a second matching circuit disposed on the output side of the receive filter, and a control circuit. The receive filter and the first and second matching circuits are arranged at the first major surface. The low-noise amplifier, the antenna switch, and the control circuit are arranged at the second major surface. When the module substrate is viewed in plan view, the receive filter is positioned between the first and second matching circuits, the control circuit is positioned between the antenna switch and the low-noise amplifier, and respective footprints of the second matching circuit and the low-noise amplifier coincide with each other.

20 Claims, 3 Drawing Sheets

RADIO-FREQUENCY MODULE AND COMMUNICATION DEVICE

CROSS-REFERENCE TO RELATED APPLICATION

The present application claims priority to Japanese patent application JP2020-103360, filed Jun. 15, 2020, the entire contents of which being incorporated herein by reference.

BACKGROUND

1. Field

The present disclosure relates to a radio-frequency (RF) module and a communication device.

2. Description of the Related Art

A mobile communication device such as a mobile phone is equipped with a low-noise amplifier for amplifying a radio-frequency receive signal. Japanese Unexamined Patent Application Publication No. 2018-137522 (Patent Document 1) discloses a front-end circuit (radio frequency (RF) module) including a power amplifier (PA) circuit (transmit amplifier circuit) configured to communicate a transmit signal and a low-noise amplifier (LNA) circuit (receive amplifier circuit) configured to communicate a receive signal. In the receive amplifier circuit, receive filters coupled to input terminals of low-noise amplifiers, an antenna switch, and an LNA controller for controlling the low-noise amplifiers are arranged.

SUMMARY

However, as recognized by the present inventor, when the receive amplifier circuit of Patent Document 1 is configured as a small front-end circuit by using a single radio-frequency module, there is a problem in which the isolation existing between the input and output paths of the receive filter is degraded because a wiring connecting the receive filter and the antenna switch and a wiring connecting the receive filter and the low-noise amplifier are coupled to each other via an electromagnetic field, and as a result, the receive sensitivity is decreased.

The present disclosure has been made to address the problem described above, and an object thereof is to provide a small radio-frequency module and a small communication device that can reduce degradation of the isolation existing between input and output paths of a receive filter.

To achieve the object described above, a radio-frequency module according to an aspect of the present disclosure includes a module substrate having a first major surface and a second major surface on opposite sides of the module substrate; an antenna connection terminal; a receive filter; a low-noise amplifier; an antenna switch configured to control connection and disconnection between the antenna connection terminal and the receive filter; a first matching circuit coupled between an input terminal of the receive filter and the antenna switch; a second matching circuit coupled between an output terminal of the receive filter and the low-noise amplifier; and a control circuit configured to control at least one of the low-noise amplifier and the antenna switch, wherein the receive filter, the first matching circuit, and the second matching circuit are disposed on a first major surface-side of the module substrate, the low-noise amplifier, the antenna switch, and the control circuit are included in a semiconductor integrated circuit disposed on a second major surface-side of the module substrate, and from a plan view of the module substrate, the receive filter is positioned between the first matching circuit and the second matching circuit, the control circuit is positioned between the antenna switch and the low-noise amplifier, and respective footprints of the second matching circuit and the low-noise amplifier at least partially coincide with each other.

Other features, elements, characteristics, and advantages of the present disclosure will become more apparent from the following detailed description of embodiments of the present disclosure with reference to the attached drawings.

DESCRIPTION OF THE EMBODIMENTS

Hereinafter, embodiments of the present disclosure will be described in detail. It should be noted that the embodiments described below are all specific or comprehensive instances. The numerical values, the shapes, the materials, the constituent elements, the arrangements of the constituent elements, and the modes of connection, and the like given in the following embodiments are mere instances and are not intended to limit the present disclosure. Among the constituent elements in the following embodiments and modified examples, constituent elements not recited in any of the independent claims are described as arbitrary constituent elements. Furthermore, the size or the size ratio of the constituent elements illustrated in the drawings is not necessarily presented in an exact manner. Like reference symbols are used to denote substantially like configurations in the drawings, and redundant descriptions thereof may be omitted or simplified.

In the following description, words used to express relationships between elements, such as parallel and vertical, words used to express the shape of an element, such as rectangular, and numerical ranges do not necessarily denote the exact meanings but denote substantially the same meanings involving, for example, several percent differences.

Further, in the following description, the sentence "when the substrate (or the major surface of the substrate) is viewed in plan view, C is disposed between A and B" denotes that the region occupied by C is intersected by at least one of the line segments connecting points within A and points within B when the substrate is viewed in plan view. The plan view of a substrate denotes that the substrate and circuit elements mounted on the substrate are viewed in the state in which the substrate and circuit elements are orthogonally projected on a plane parallel to the major surface of the substrate.

Furthermore, in the following description, "transmit path" denotes a communication line constituted by, for example, a wiring through which a radio-frequency transmit signal travels, an electrode directly coupled to the wiring, and a terminal directly coupled to the wiring or the electrode. Similarly, "receive path" denotes a communication line constituted by, for example, a wiring through which a radio-frequency receive signal travels, an electrode directly coupled to the wiring, and a terminal directly coupled to the wiring or the electrode. Similarly, "transmit and receive path" denotes a communication line constituted by, for example, a wiring through which a radio-frequency transmit signal and a radio-frequency receive signal travel, an electrode directly coupled to the wiring, and a terminal directly coupled to the wiring or the electrode.

Embodiment

1. Circuit Configuration of Radio-frequency Module 1 and Communication Device 5

Figure 1:
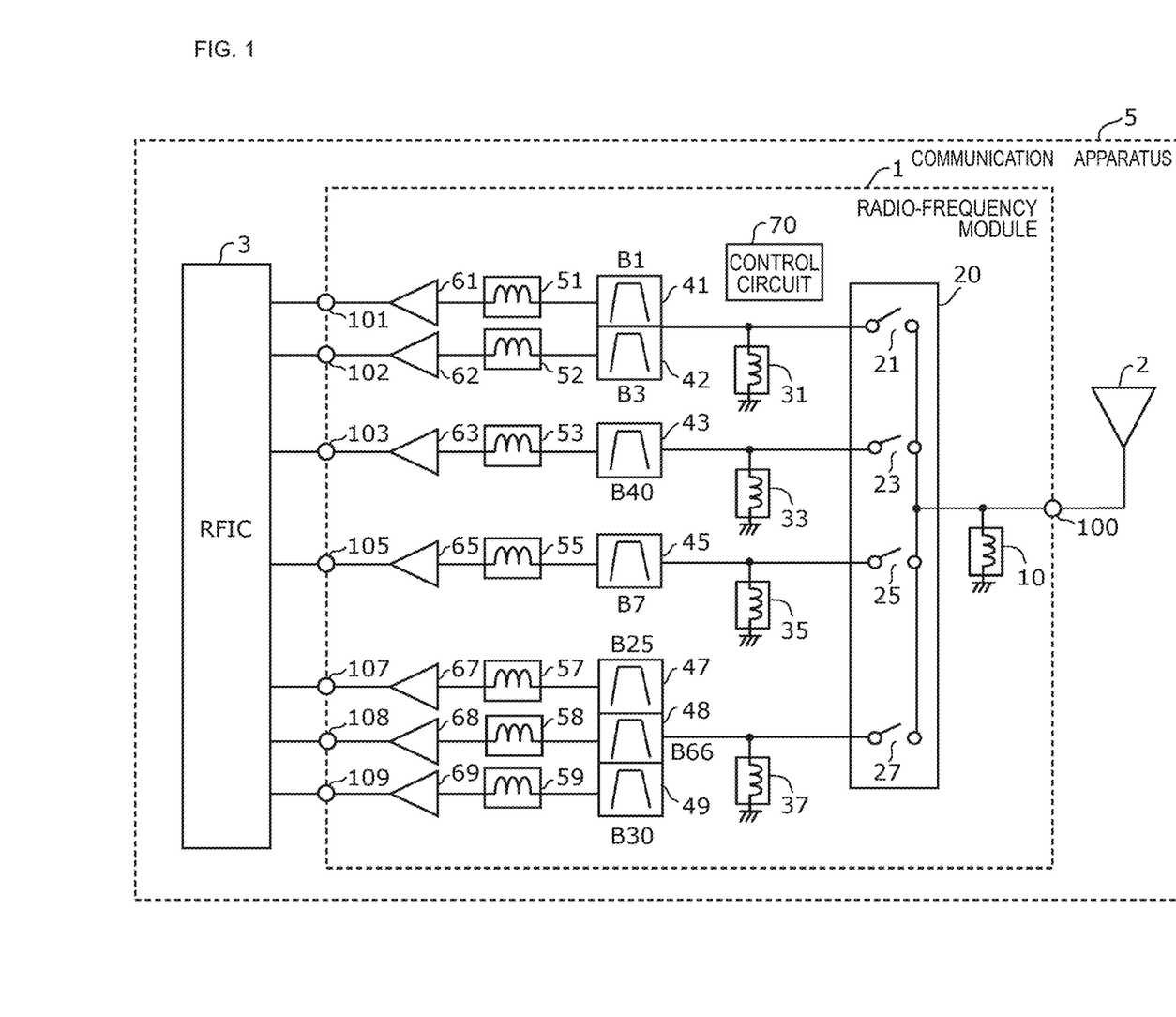
FIG. 1 is a circuit configuration diagram of a radio-frequency module and a communication device according to an embodiment.

FIG. 1 is a circuit configuration diagram of a radio-frequency module 1 and a communication device 5 (sometimes referred to as a communications apparatus 5) according to an embodiment. As illustrated in FIG. 1, the communication apparatus 5 includes the radio-frequency module 1, an antenna 2, and a radio frequency signal processing circuit (RFIC) 3. In this exemplary configuration the communication apparatus 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

The RFIC 3 is a radio frequency signal processing circuit configured to process a radio-frequency signal received or to be transmitted by the antenna 2. Specifically, the RFIC 3 processes a receive signal inputted through a receive path of the radio-frequency module 1 by performing, for example, downconversion and outputs the processed receive signal generated by the signal processing to a baseband signal processing circuit (not illustrated in the drawing).

The RFIC 3 also functions as a controller (or control circuitry) that controls connection of an antenna switch 20 included in the radio-frequency module 1 in accordance with information about, for example, the communication band (frequency band) that is used. Specifically, the RFIC 3 controls connection of the antenna switch 20 included in the radio-frequency module 1 by using a control signal. Specifically, the RFIC 3 outputs to a control circuit 70, for example, digital control signals for controlling the antenna switch 20 such as mobile industry processor interface (MIPI) and general-purpose input/output (GPIO) signals. The control circuit 70 controls connection and disconnection of the antenna switch 20 by, for example, outputting a digital control signal to the antenna switch 20 in accordance with the digital control signal inputted by the RFIC 3. It should be noted that the RFIC 3 may output an analog control signal.

The RFIC 3 also functions as a controller that controls the gain of the low-noise amplifiers 61, 62, 63, 65, 67, 68, and 69 (hereinafter also referred to as the low-noise amplifiers 61 to 69) included in the radio-frequency module 1 and a supply voltage Vcc and a bias voltage Vbias that are supplied to the low-noise amplifiers 61 to 69. Specifically, the RFIC 3 outputs to the control circuit 70 digital control signals such as MIPI and GPIO signals. The control circuit 70 controls the gain of the low-noise amplifiers 61 to 69 by outputting a control signal, the supply voltage Vcc, or the bias voltage Vbias to the low-noise amplifiers 61 to 69 in accordance with the digital control signal inputted by the RFIC 3. It should be noted that a constituent element (i.e., one or more external circuits, such as programmable circuitry) configured to function as the controller may be provided outside the RFIC 3.

The antenna 2 is coupled to an antenna connection terminal 100 of the radio-frequency module 1. The antenna 2 receives a radio-frequency signal from outside and outputs the radio-frequency signal to the radio-frequency module 1.

In the communication device 5 according to the present embodiment, the antenna 2 is a non-essential constituent element.

Next, details of the configuration of the radio-frequency module 1 will be described.

As illustrated in FIG. 1, the radio-frequency module 1 includes the antenna connection terminal 100, receive filters 41, 42, 43, 45, 47, 48, and 49 (hereinafter also referred to as the receive filters 41 to 49), the low-noise amplifiers 61 to 69, the antenna switch 20, matching circuits 10, 31, 33, 35, 37, 51, 52, 53, 55, 57, 58, and 59, and the control circuit 70.

The antenna connection terminal 100 is coupled to the antenna 2.

The receive filter 41 is disposed in a receive path connecting the antenna connection terminal 100 and a receive output terminal 101. Of the receive signals input from the antenna connection terminal 100, the receive filter 41 passes receive signals in a frequency band including a receive band (downlink operating band) of a first communication band. The first communication band is, for example, Band 1 (receive frequency range: 2110-2170 MHz) of Long Term Evolution (LTE). An input terminal of the receive filter 41 is coupled to one terminal of a switch 21. An output terminal of the receive filter 41 is coupled to an input terminal of the low-noise amplifier 61 via the matching circuit 51.

The receive filter 42 is disposed in a receive path connecting the antenna connection terminal 100 and a receive output terminal 102. Of the receive signals inputted from the antenna connection terminal 100, the receive filter 42 passes receive signals in a frequency band including a receive band of a second communication band. The second communication band is, for example, LTE Band 3 (receive frequency range: 1805-1880 MHz). An input terminal of the receive filter 42 is coupled to the one terminal of the switch 21. An output terminal of the receive filter 42 is coupled to an input terminal of the low-noise amplifier 62 via the matching circuit 52. With the connection configuration described above, the receive filters 41 and 42 form a first multiplexer.

The receive filter 43 is disposed in a receive path connecting the antenna connection terminal 100 and a receive output terminal 103. Of the receive signals inputted from the antenna connection terminal 100, the receive filter 43 passes receive signals in a frequency band including a receive band of a third communication band. The third communication band is, for example, LTE Band 40 (receive frequency range: 2300-2400 MHz). An input terminal of the receive filter 43 is coupled to one terminal of a switch 23. An output terminal of the receive filter 43 is coupled to an input terminal of the low-noise amplifier 63 via the matching circuit 53.

The receive filter 45 is disposed in a receive path connecting the antenna connection terminal 100 and a receive output terminal 105. Of the receive signals inputted from the antenna connection terminal 100, the receive filter 45 passes receive signals in a frequency band including a receive band of a fourth communication band. The fourth communication band is, for example, LTE Band 7 (receive frequency range: 2620-2690 MHz). An input terminal of the receive filter 45 is coupled to one terminal of a switch 25. An output terminal of the receive filter 45 is coupled to an input terminal of the low-noise amplifier 65 via the matching circuit 55.

The receive filter 47 is disposed in a receive path connecting the antenna connection terminal 100 and a receive output terminal 107. Of the receive signals inputted from the antenna connection terminal 100, the receive filter 47 passes receive signals in a frequency band including a receive band of a fifth communication band. The fifth communication band is, for example, LTE Band 25 (receive frequency range: 1930-1995 MHz). An input terminal of the receive filter 47 is coupled to one terminal of a switch 27. An output terminal of the receive filter 47 is coupled to an input terminal of the low-noise amplifier 67 via the matching circuit 57.

The receive filter 48 is disposed in a receive path connecting the antenna connection terminal 100 and a receive output terminal 108. Of the receive signals inputted from the antenna connection terminal 100, the receive filter 48 passes receive signals in a frequency band including a receive band of a sixth communication band. The sixth communication band is, for example, LTE Band 66 (receive frequency range: 2110-2200 MHz). An input terminal of the receive filter 48 is coupled to the one terminal of the switch 27. An output terminal of the receive filter 48 is coupled to an input terminal of the low-noise amplifier 68 via the matching circuit 58.

The receive filter 49 is disposed in a receive path connecting the antenna connection terminal 100 and a receive output terminal 109. Of the receive signals inputted from the antenna connection terminal 100, the receive filter 49 passes receive signals in a frequency band including a receive band of a seventh communication band. The seventh communication band is, for example, LTE Band 30 (receive frequency range: 2350-2360 MHz). An input terminal of the receive filter 49 is coupled to the one terminal of the switch 27. An output terminal of the receive filter 49 is coupled to an input terminal of the low-noise amplifier 69 via the matching circuit 59. With the connection configuration described above, the receive filters 47, 48, and 49 form a second multiplexer.

The receive filters 41 to 49 may each form a duplexer configured to communicate transmit and receive signals by using a frequency division duplex (FDD) system in association with a transmit filter configured to pass a transmit signal. The receive filters 41 to 49 may be receive filters used when transmit and receive signals are communicated by using a time division duplex (TDD) system.

The receive filters 41 to 49 may be, but not limited to, acoustic wave filters using a surface acoustic wave (SAW), acoustic wave filters using a bulk acoustic wave (BAW), LC resonance filters, or dielectric filters.

The low-noise amplifier 61 is a receive amplifier capable of amplifying receive signals in the first communication band with low noise and is configured to output the amplified receive signals to the receive output terminal 101. The low-noise amplifier 62 is a receive amplifier capable of amplifying receive signals in the second communication band with low noise and is configured to output the amplified receive signals to the receive output terminal 102. The low-noise amplifier 63 is a receive amplifier capable of amplifying receive signals in the third communication band with low noise and is configured to output the amplified receive signals to the receive output terminal 103. The low-noise amplifier 65 is a receive amplifier capable of amplifying receive signals in the fourth communication band with low noise and is configured to output the amplified receive signals to the receive output terminal 105. The low-noise amplifier 67 is a receive amplifier capable of amplifying receive signals in the fifth communication band with low noise and is configured to output the amplified receive signals to the receive output terminal 107. The low-noise amplifier 68 is a receive amplifier capable of amplifying receive signals in the sixth communication band with low noise and is configured to output the amplified receive signals to the receive output terminal 108. The low-noise amplifier 69 is a receive amplifier capable of amplifying receive signals in the seventh communication band with low noise and is configured to output the amplified receive signals to the receive output terminal 109. In the following description, the receive output terminals 101, 102, 103, 105, 107, 108, and 109 are also referred to as the receive output terminals 101 to 109.

The low-noise amplifiers 61 to 69 are constituted by, for example, field-effect transistors (FETs) or heterojunction bipolar transistors (HBTs) made by using a Si complementary metal oxide semiconductor (CMOS) or GaAs.

The antenna switch 20 includes the switches 21, 23, 25, and 27 that are single-pole single-throw (SPST) switches. The other terminal of the switch 21, the other terminal of the switch 23, the other terminal of the switch 25, and the other terminal of the switch 27 are coupled to the antenna connection terminal 100 via the matching circuit 10. The switch 21 controls connection and disconnection between the antenna connection terminal 100 and the first multiplexer. The switch 23 controls connection and disconnection between the antenna connection terminal 100 and the receive filter 43. The switch 25 controls connection and disconnection between the antenna connection terminal 100 and the receive filter 45. The switch 27 controls connection and disconnection between the antenna connection terminal 100 and the second multiplexer. With this configuration, the antenna switch 20 is configured to: (1) control connection and disconnection between the first multiplexer and the antenna connection terminal 100; (2) control connection and disconnection between the receive filter 43 and the antenna connection terminal 100; (3) control connection and disconnection between the receive filter 45 and the antenna connection terminal 100; (4) control connection and disconnection between the second multiplexer and the antenna connection terminal 100. The number of switches included in the antenna switch 20 is appropriately set in accordance with the number of signal paths included in the radio-frequency module 1.

The matching circuit 10 is an example of an impedance matching circuit. The matching circuit 10 is disposed in a receive path connecting the antenna connection terminal 100 and the antenna switch 20 and configured to match the impedance of the antenna 2 and the impedance of the antenna switch 20.

The matching circuit 31 is an example of a first matching circuit. The matching circuit 31 is coupled between the antenna switch 20 and an input terminal of the first multiplexer and configured to match the impedance of the antenna switch 20 and the impedance of the first multiplexer. The matching circuit 33 is an example of the first matching circuit. The matching circuit 33 is coupled between the antenna switch 20 and the input terminal of the receive filter 43 and configured to match the impedance of the antenna switch 20 and the impedance of the receive filter 43. The matching circuit 35 is an example of the first matching circuit. The matching circuit 35 is coupled between the antenna switch 20 and the input terminal of the receive filter 45 and configured to match the impedance of the antenna switch 20 and the impedance of the receive filter 45. The matching circuit 37 is an example of the first matching circuit. The matching circuit 37 is coupled between the antenna switch 20 and an input terminal of the second multiplexer and configured to match the impedance of the antenna switch 20 and the impedance of the second multiplexer. In the following description, the matching circuits 31, 33, 35, and 37 are also referred to as the matching circuits 31 to 37.

The matching circuit 51 is an example of a second matching circuit. The matching circuit 51 is coupled between the input terminal of the low-noise amplifier 61 and the output terminal of the receive filter 41 and configured to match the impedance of the low-noise amplifier 61 and the impedance of the receive filter 41. The matching circuit 52 is an example of the second matching circuit. The matching circuit 52 is coupled between the input terminal of the low-noise amplifier 62 and the output terminal of the receive filter 42 and configured to match the impedance of the low-noise amplifier 62 and the impedance of the receive filter 42. The matching circuit 53 is an example of a second matching circuit. The matching circuit 53 is coupled between the input terminal of the low-noise amplifier 63 and the output terminal of the receive filter 43 and configured to match the impedance of the low-noise amplifier 63 and the impedance of the receive filter 43. The matching circuit 55 is an example of the second matching circuit. The matching circuit 55 is coupled between the input terminal of the low-noise amplifier 65 and the output terminal of the receive filter 45 and configured to match the impedance of the low-noise amplifier 65 and the impedance of the receive filter 45. The matching circuit 57 is an example of the second matching circuit. The matching circuit 57 is coupled between the input terminal of the low-noise amplifier 67 and the output terminal of the receive filter 47 and configured to match the impedance of the low-noise amplifier 67 and the impedance of the receive filter 47. The matching circuit 58 is an example of the second matching circuit. The matching circuit 58 is coupled between the input terminal of the low-noise amplifier 68 and the output terminal of the receive filter 48 and configured to match the impedance of the low-noise amplifier 68 and the impedance of the receive filter 48. The matching circuit 59 is an example of the second matching circuit. The matching circuit 59 is coupled between the input terminal of the low-noise amplifier 69 and the output terminal of the receive filter 49 and configured to match the impedance of the low-noise amplifier 69 and the impedance of the receive filter 49. In the following description, the matching circuits 51, 52, 53, 55, 57, 58, and 59 are also referred to as the matching circuits 51 to 59.

The matching circuits 10, 31 to 37, and 51 to 59 are each constituted by at least one of an inductor and a capacitor.

The matching circuits 10, 31 to 37, and 51 to 59 may be each coupled between the corresponding receive path and the ground, disposed in series with the corresponding receive path, or disposed between the corresponding receive path and the ground and in the corresponding receive path.

In accordance with digital control signals such as MIPI and GPIO signals inputted by the RFIC 3, the control circuit 70 controls connection and disconnection of the antenna switch 20 and adjusts the gain of the low-noise amplifiers 61 to 69.

The antenna switch 20 and the control circuit 70 are included in a single-chip semiconductor integrated circuit (IC). The semiconductor IC is constituted by, for example, a CMOS structure. Specifically, the semiconductor IC is formed by a silicon on insulator (SOI) process. Thus, it is possible to inexpensively manufacture the semiconductor IC. The semiconductor IC may be formed of at least any of GaAs, SiGe, and GaN. With this configuration, it is possible to output radio-frequency signals with high amplification performance and low-noise performance when the semiconductor IC includes an amplifier.

Additionally, the semiconductor IC may include at least one of the low-noise amplifiers 61 to 69.

In the configuration of the radio-frequency module 1, the switch 21, the matching circuit 31, the receive filter 41, the matching circuit 51, and the low-noise amplifier 61 together form a first receive circuit configured to communicate a receive signal in the first communication band inputted from the antenna 2 through the antenna connection terminal 100. The switch 21, the matching circuit 31, the receive filter 42, the matching circuit 52, and the low-noise amplifier 62 together form a second receive circuit configured to communicate a receive signal in the second communication band inputted from the antenna 2 through the antenna connection terminal 100. The switch 23, the matching circuit 33, the receive filter 43, the matching circuit 53, and the low-noise amplifier 63 together form a third receive circuit configured to communicate a receive signal in the third communication band inputted from the antenna 2 through the antenna connection terminal 100. The switch 25, the matching circuit 35, the receive filter 45, the matching circuit 55, and the low-noise amplifier 65 together form a fourth receive circuit configured to communicate a receive signal in the fourth communication band inputted from the antenna 2 through the antenna connection terminal 100. The switch 27, the matching circuit 37, the receive filter 47, the matching circuit 57, and the low-noise amplifier 67 together form a fifth receive circuit configured to communicate a receive signal in the fifth communication band inputted from the antenna 2 through the antenna connection terminal 100. The switch 27, the matching circuit 37, the receive filter 48, the matching circuit 58, and the low-noise amplifier 68 together form a sixth receive circuit configured to communicate a receive signal in the sixth communication band inputted from the antenna 2 through the antenna connection terminal 100. The switch 27, the matching circuit 37, the receive filter 49, the matching circuit 59, and the low-noise amplifier 69 together form a seventh receive circuit configured to communicate a receive signal in the seventh communication band inputted from the antenna 2 through the antenna connection terminal 100.

With the circuit configuration described above, the radio-frequency module 1 can receive a radio-frequency signal in any of the first to seventh communication bands. Furthermore, the radio-frequency module 1 can also simultaneously receive radio-frequency signals in two or more bands of the first to seventh communication bands.

It should be noted that the radio-frequency module according to the present disclosure only needs to include at least one of the first to seventh receive circuits, the antenna switch 20, and the control circuit 70.

The radio-frequency module according to the present disclosure may include transmit circuits respectively corresponding to the first to seventh receive circuits. Each transmit circuit is constituted by, for example, a power amplifier configured to amplify a transmit signal, a transmit filter configured to pass the transmit signal, and a matching circuit.

However, when the radio-frequency module 1 is configured as a small front-end circuit, there is a performance risk in which the isolation existing between the input and output paths of the receive filters 41 to 49 may be degraded because the wirings (or conductive paths) connecting the receive filters 41 to 49 and the antenna switch 20 and the wirings connecting the receive filters 41 to 49 and the low-noise amplifiers 61 to 69 are coupled to each other via an electromagnetic field, and as a result, the receive sensitivity is decreased. In response to this, the following describes a configuration of the radio-frequency module 1 of a small size in which degradation of the isolation existing between the input and output paths of the receive filters 41 to 49 is suppressed.

Figure 2A:
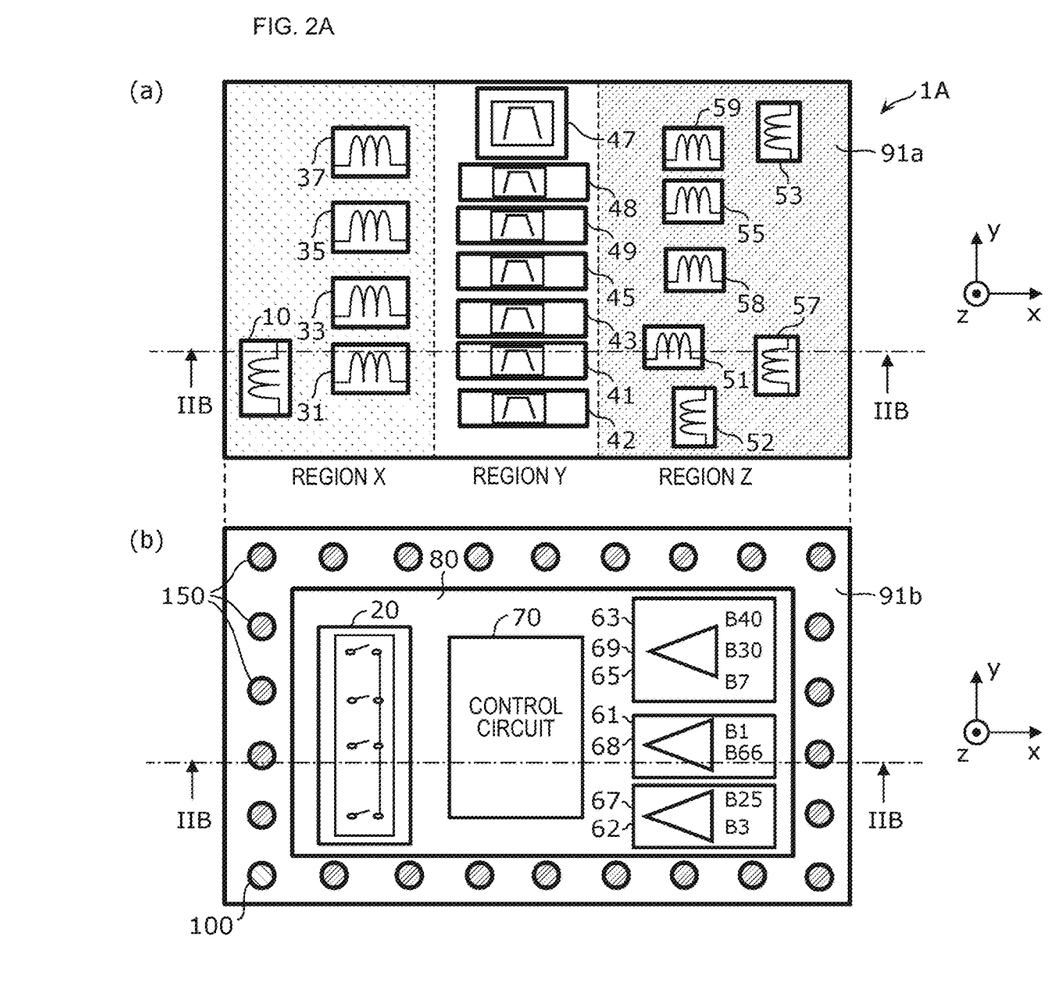
FIG. 2A provides schematic diagrams of planar configuration of a radio-frequency module according to a practical example.
Figure 2B:
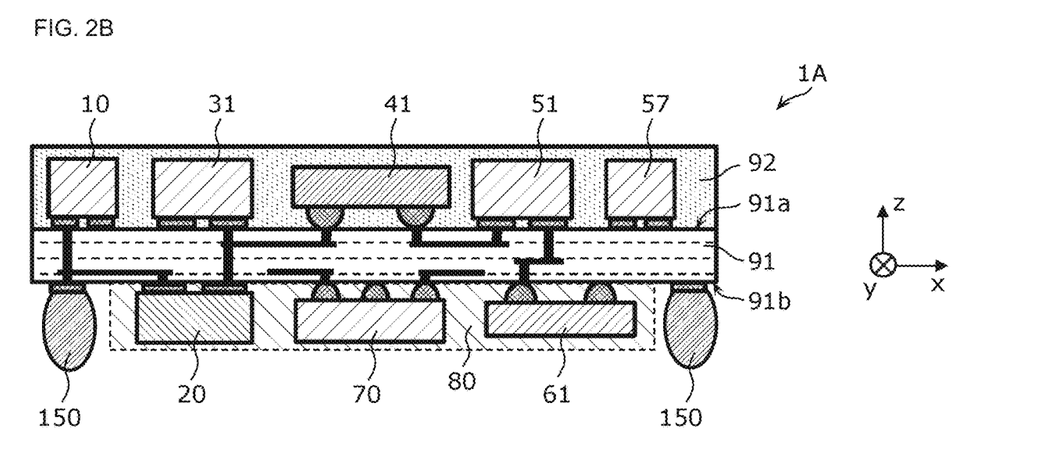
FIG. 2B is a schematic diagram of a sectional configuration of the radio-frequency module according to the practical example.

2. Arrangement of Circuit Elements of Radio-frequency Module 1A According to Practical Examples FIG. 2A provides two schematic diagrams of planar configuration of a radio-frequency module 1A according to a practical example. FIG. 2B is a schematic diagram of a sectional configuration of the radio-frequency module 1A according to the practical example, more specifically, a sectional view taken along line IIB-IIB in FIG. 2A. In FIG. 2A, (a) illustrates an arrangement of circuit elements when a major surface 91a of a module substrate 91 is viewed in the forward direction of the Z axis; and (b) illustrates a transparent view of an arrangement of circuit elements when a major surface 91b of the module substrate 91, which is on the opposite side of the module substrate 91 to the major surface 91a, is viewed in the forward direction of the Z axis.

The radio-frequency module 1A according to this practical example specifically presents the arrangement of the circuit components of the radio-frequency module 1 according to the embodiment.

As illustrated in FIGS. 2A and 2B, the radio-frequency module 1A according to the practical example includes, in addition to the circuit configuration illustrated in FIG. 1, the module substrate 91, a resin member 92, and external connection terminals 150.

The module substrate 91 has the major surface 91a (first major surface) and the major surface 91b (second major surface) on opposite sides of the module substrate 91. At the module substrate 91, the receive circuit described above is provided. As the module substrate 91, for example, a low temperature co-fired ceramics (LTCC) substrate having a layered structure composed of a plurality of dielectric layers, a high temperature co-fired ceramics (HTCC) substrate, a component-embedded substrate, a substrate including a redistribution layer (RDL), or a printed board is used.

The resin member 92 is disposed on the major surface 91a of the module substrate 91 and covers exposed parts of the receive circuit and exposed portions (e.g., those portions in which a discrete component is not in direct contact with the module substrate 91) of the major surface 91a of the module substrate 91. The resin member 92 has a function of reliably securing, for example, the mechanical strength and moisture resistance of the circuit elements constituting the receive circuit. It should be noted that the resin member 92 is not a constituent element essential for the radio-frequency module according to the present disclosure.

As illustrated in FIGS. 2A and 2B, in the radio-frequency module 1A according to this practical example, the receive filters 41 to 49, the matching circuit 10, the matching circuits 31 to 37, and the matching circuits 51 to 59 are arranged at the major surface 91a (first major surface). The antenna switch 20, the control circuit 70, and the low-noise amplifiers 61 to 69 are arranged at the major surface 91b (second major surface).

The antenna switch 20, the control circuit 70, and the low-noise amplifiers 61 to 69 are included in a semiconductor IC 80 disposed at the major surface 91b.

Because with this configuration the circuit components constituting the radio-frequency module 1A are separately arranged at the major surfaces 91a and 91b of the module substrate 91, it is possible to downsize the radio-frequency module 1A. Furthermore, since the antenna switch 20, the control circuit 70, and the low-noise amplifiers 61 to 69 are integrated in the semiconductor IC 80 at the major surface 91b, it is possible to reduce the area of the major surface 91b and achieve a low-profile structure at the major surface 91b.

Wirings (or conductive traces/paths) serving as the receive paths connecting the circuit components illustrated in FIG. 1, which are not illustrated in FIG. 2A, are formed inside the module substrate 91, and at the major surfaces 91a and 91b. The wiring may be a bonding wire having ends connected to the major surface 91a or 91b, and any of the circuit elements constituting the radio-frequency module 1A. Alternatively, the wiring may be a terminal, an electrode, or a wiring formed at a surface of any of the circuit elements constituting the radio-frequency module 1A. The structure in which the semiconductor IC includes the circuit elements is defined as the structure in which circuit elements are formed at a surface of a single semiconductor substrate or inside the single semiconductor substrate or the structure in which circuit elements are integrated in a single package. The single semiconductor substrate and the single package are different from the module substrate 91 and also different from an external substrate at which the radio-frequency module 1A is disposed.

When the module substrate 91 is viewed in plan view, the receive filter 41 is disposed between the matching circuits 31 and 51, and the control circuit 70 is disposed between the antenna switch 20 and the low-noise amplifier 61. The matching circuit 51 and the low-noise amplifier 61 at least partially coincide with each other.

In the configuration described above, at the major surface 91a, the matching circuit 31, the receive filter 41, and the matching circuit 51 are arranged in the order presented. The matching circuit 51 and the low-noise amplifier 61 face each other with the module substrate 91 interposed between the matching circuit 51 and the low-noise amplifier 61. Since the matching circuit 31 and the matching circuit 51 are spaced apart from each other because of the receive filter 41 being interposed between the matching circuit 31 and the matching circuit 51, it is possible to hinder electromagnetic field coupling between the matching circuit 31 and the matching circuit 51. As a result, degradation of the isolation existing between the input and output paths of the receive filter 41 is suppressed, and thus, it is possible to suppress degradation of the receive sensitivity of the first receive circuit configured to pass signals in the first communication band. Moreover, since at the major surface 91b the antenna switch 20 and the low-noise amplifier 61 are spaced apart from each other because of the control circuit 70 interposed between the antenna switch 20 and the low-noise amplifier 61, it is possible to hinder electromagnetic field coupling between the antenna switch 20 and the low-noise amplifier 61. Thus, it is possible to prevent a receive signal in the first communication band having traveled through the antenna switch 20 from being inputted to the low-noise amplifier 61 without passing the receive filter 41. As a result, it is possible to suppress degradation of the receive sensitivity of the first receive circuit configured to pass signals in the first communication band. As such, it is possible to provide the radio-frequency module 1A of a small size in which degradation of the isolation existing between the input and output paths of the receive filter 41 is suppressed.

In the radio-frequency module 1A, the matching circuit 31 and the antenna switch 20 at least partially coincide with each other. This means that the matching circuit 31 and the antenna switch 20 face each other with the module substrate 91 interposed between the matching circuit 31 and the antenna switch 20. This configuration shortens the receive path connecting the antenna switch 20, the matching circuit 31, the receive filter 41, the matching circuit 51, and the low-noise amplifier 61. As a result, it is possible to reduce the noise threshold, and thus avoidance of communication loss of receive signal, in the first receive circuit.

The receive filter 42 is disposed between the matching circuits 31 and 52, and the control circuit 70 is disposed between the antenna switch 20 and the low-noise amplifier 62. The matching circuit 31 and the antenna switch 20 at least partially coincide with each other. The matching circuit 52 and the low-noise amplifier 62 at least partially coincide with each other.

In the configuration described above, at the major surface 91a, the matching circuit 31, the receive filter 42, and the matching circuit 52 are arranged in the order presented. The matching circuit 31 and the antenna switch 20 face each other with the module substrate 91 interposed between the matching circuit 31 and the antenna switch 20. The matching circuit 52 and the low-noise amplifier 62 face each other (respective footprints of which at least partially overlap from a plan view of one of the major surfaces of the module substrate 91) with the module substrate 91 interposed between the matching circuit 52 and the low-noise amplifier 62. This configuration shortens the receive path connecting the antenna switch 20, the matching circuit 31, the receive filter 42, the matching circuit 52, and the low-noise amplifier 62. As a result, it is possible to reduce the communication loss of receive signal in the second receive circuit as a result of inter-circuit electromagnetic interference (EMI). Because the matching circuit 31 and the matching circuit 52 are spaced apart from each other because of the receive filter 42 interposed between the matching circuit 31 and the matching circuit 52, it is possible to hinder electromagnetic field coupling between the matching circuit 31 and the matching circuit 52. As a result, degradation of the isolation existing between the input and output paths of the receive filter 42 is suppressed, and thus, it is possible to suppress degradation of the receive sensitivity of the second receive circuit configured to pass signals in the second communication band. Moreover, since at the major surface 91b the antenna switch 20 and the low-noise amplifier 62 are spaced apart from each other because of the control circuit 70 interposed between the antenna switch 20 and the low-noise amplifier 62, it is possible to hinder electromagnetic field coupling between the antenna switch 20 and the low-noise amplifier 62. Thus, it is possible to prevent a receive signal in the second communication band having traveled through the antenna switch 20 from being inputted to the low-noise amplifier 62 without passing the receive filter 42. As a result, it is possible to suppress degradation of the receive sensitivity of the second receive circuit configured to pass signals in the second communication band. As such, it is possible to provide the radio-frequency module 1A of a small size in which degradation of the isolation existing between the input and output paths of the receive filter 42 is suppressed.

The receive filters 43, 45, 47, 48 and 49 may be arranged in the same arrangement manner as that of the receive filters 41 and 42. Specifically, the receive filter 43 may be disposed between the matching circuit 33 and the matching circuit 53; the control circuit 70 may be disposed between the antenna switch 20 and the low-noise amplifier 63; the matching circuit 33 and the antenna switch 20 may at least partially coincide with each other; and the matching circuit 53 and the low-noise amplifier 63 may at least partially coincide with each other. The receive filter 45 may be disposed between the matching circuit 35 and the matching circuit 55; the control circuit 70 may be disposed between the antenna switch 20 and the low-noise amplifier 65; the matching circuit 35 and the antenna switch 20 may at least partially coincide with each other; and the matching circuit 55 and the low-noise amplifier 65 may at least partially coincide with each other. The receive filter 47 may be disposed between the matching circuit 37 and the matching circuit 57; the control circuit 70 may be disposed between the antenna switch 20 and the low-noise amplifier 67; the matching circuit 37 and the antenna switch 20 may at least partially coincide with each other; and the matching circuit 57 and the low-noise amplifier 67 may at least partially coincide with each other. The receive filter 48 may be disposed between the matching circuit 37 and the matching circuit 58; the control circuit 70 may be disposed between the antenna switch 20 and the low-noise amplifier 68; the matching circuit 37 and the antenna switch 20 may at least partially coincide with each other; and the matching circuit 58 and the low-noise amplifier 68 may at least partially coincide with each other. The receive filter 49 may be disposed between the matching circuit 37 and the matching circuit 59; the control circuit 70 may be disposed between the antenna switch 20 and the low-noise amplifier 69; the matching circuit 37 and the antenna switch 20 may at least partially coincide with each other; and the matching circuit 59 and the low-noise amplifier 69 may at least partially coincide with each other. Each configuration enables the provision of the radio-frequency module 1A of a small size in which degradation of the isolation existing between the input and output paths of a corresponding one of the receive filters 43, 45, 47, 48, and 49 is suppressed.

When the module substrate 91 is viewed in plan view, the receive filters 41 to 49 are arranged in a region Y between a region X including the matching circuits 31 to 37 and a region Z including the matching circuits 51 to 59. The control circuit 70 is disposed between the antenna switch 20 and the low-noise amplifiers 61 to 69. The region X and the antenna switch 20 at least partially coincide with each other. The region Z and the low-noise amplifiers 61 to 69 at least partially coincide with each other.

In the configuration described above, at the major surface 91a, the matching circuits 31 to 37, the receive filters 41 to 49, and the matching circuits 51 to 59 are arranged in the order presented. The matching circuits 31 to 37 and the antenna switch 20 face each other with the module substrate 91 interposed between the matching circuits 31 to 37 and the antenna switch 20. The matching circuits 51 to 59 and the low-noise amplifiers 61 to 69 face each other with the module substrate 91 interposed between the matching circuits 51 to 59 and the low-noise amplifiers 61 to 69. This configuration shortens the receive path of the entire radio-frequency module 1A formed by adding together the receive path of the first receive circuit to the receive path of the seventh receive circuit. As a result, it is possible to reduce the communication loss of receive signal in the radio-frequency module 1A. Since the matching circuits 31 to 37 and the matching circuits 51 to 59 are spaced apart from each other because of the receive filters 41 to 49 interposed between the matching circuits 31 to 37 and the matching circuits 51 to 59, it is possible to hinder electromagnetic field coupling between the matching circuits 31 to 37 and the matching circuits 51 to 59. As a result, degradation of the isolation existing between the input and output paths of the receive filters 41 to 49 is suppressed, and thus, it is possible to suppress degradation of the receive sensitivity of the first to seventh receive circuits. Moreover, since at the major surface 91b the antenna switch 20 and the low-noise amplifiers 61 to 69 are spaced apart from each other because of the control circuit 70 interposed between the antenna switch 20 and the low-noise amplifiers 61 to 69, it is possible to hinder electromagnetic field coupling between the antenna switch 20 and the low-noise amplifiers 61 to 69. Thus, it is possible to prevent a receive signal in the first to seventh communication bands having traveled through the antenna switch 20 from being inputted to a corresponding one of the low-noise amplifiers 61 to 69 without passing a corresponding one of the receive filters 41 to 49. As a result, it is possible to suppress degradation of the receive sensitivity of the first to seventh receive circuits configured to pass signals in the first to seventh communication bands. As such, it is possible to provide the radio-frequency module 1A of a small size in which degradation of the isolation existing between the input and output paths of the receive filters 41 to 49 is suppressed.

The matching circuits 31 to 37 may each include a first inductor. The matching circuits 51 to 59 may each include a second inductor. In this case, it is desirable that, when the module substrate 91 is viewed in plan view, the first inductor and the antenna switch 20 at least partially coincide with each other, and the second inductor and any of the low-noise amplifiers 61 to 69 at least partially coincide with each other.

When the matching circuits 31 to 37 and the matching circuits 51 to 59 are coupled to each other via an electromagnetic field, the intensity of magnetic-field coupling between the inductors is likely to be the highest. However, with the configuration described above, the first inductor and the second inductor are spaced apart from each other because of the receive filters 41 to 49, and as a result, it is possible to hinder magnetic-field coupling between the first inductor and the second inductor. As a result, it is possible to effectively suppress degradation of the isolation existing between the input and output paths of the receive filters 41 to 49.

The radio-frequency module 1A communicates electrical signals with the external substrate disposed at a position in the reverse direction of the Z axis of the radio-frequency module 1A through the external connection terminals 150. As illustrated in (b) of FIG. 2A, the external connection terminals 150 include the antenna connection terminal 100 and the receive output terminals 101 to 109 (not indicated in (b) of FIG. 2A). Some of the external connection terminals 150 are set to a ground potential of the external substrate.

At the major surface 91b facing the external substrate, the matching circuits 31 to 37, the matching circuits 51 to 59, and the receive filters 41 to 49, which cannot be easily formed as low-profile structures, are not arranged; but the control circuit 70, the antenna switch 20, and the low-noise amplifiers 61 to 69, which can be easily formed as low-profile structures, are arranged, and as a result, it is possible to form the entire radio-frequency module 1A as a low-profile structure. Moreover, since some external connection terminals 150 serving as ground electrodes are arranged around the low-noise amplifiers 61 to 69, which greatly affect the receive sensitivity of the first to seventh receive circuits, it is possible to suppress degradation of the receive sensitivity of the first to seventh receive circuits.

It is desirable that the module substrate 91 have a multilayer structure formed by layering a plurality of dielectric layers, and a ground electrode pattern be formed at at least one of the plurality of dielectric layers. This configuration improves the module substrate 91 with respect to the capability of blocking the electromagnetic field.

In the radio-frequency module 1A, the external connection terminals 150 may be bump electrodes as illustrated in FIG. 2B, or the external connection terminals 150 may be, for example, columnar electrodes elongated from the major surface 91b in the reverse direction of the Z axis. In either case, a resin member may be provided to cover the major surface 91b.

3. Effect

As described above, the radio-frequency module 1 according to the present embodiment includes the module substrate 91 having the major surfaces 91a and 91b opposite to each other, the antenna connection terminal 100, the receive filter 41, the low-noise amplifier 61, the antenna switch 20 configured to control connection and disconnection between the antenna connection terminal 100 and the receive filter 41, the matching circuit 31 coupled between the input terminal of the receive filter 41 and the antenna switch 20, the matching circuit 51 coupled between the output terminal of the receive filter 41 and the low-noise amplifier 61, and the control circuit 70 configured to control at least one of the low-noise amplifier 61 or the antenna switch 20. The receive filter 41 and the matching circuits 31 and 51 are arranged at the major surface 91a. The low-noise amplifier 61, the antenna switch 20, and the control circuit 70 are included in the semiconductor IC 80 disposed at the major surface 91b. When the module substrate 91 is viewed in plan view, the receive filter 41 is disposed between the matching circuits 31 and 51, and the control circuit 70 is disposed between the antenna switch 20 and the low-noise amplifier 61. The matching circuit 51 and the low-noise amplifier 61 at least partially coincide with each other.

With this configuration, since the matching circuit 31 and the matching circuit 51 are spaced apart from each other because of the receive filter 41 interposed between the matching circuit 31 and the matching circuit 51, it is possible to hinder electromagnetic field coupling between the matching circuit 31 and the matching circuit 51. As a result, degradation of the isolation existing between the input and output paths of the receive filter 41 is suppressed, and thus, it is possible to suppress degradation of the receive sensitivity of the first receive circuit configured to pass signals in the first communication band. Moreover, since at the major surface 91b the antenna switch 20 and the low-noise amplifier 61 are spaced apart from each other because of the control circuit 70 interposed between the antenna switch 20 and the low-noise amplifier 61, it is possible to hinder electromagnetic field coupling between the antenna switch 20 and the low-noise amplifier 61. Thus, it is possible to prevent a receive signal in the first communication band having traveled through the antenna switch 20 from being inputted to the low-noise amplifier 61 without passing the receive filter 41. As a result, it is possible to suppress degradation of the receive sensitivity of the first receive circuit configured to pass signals in the first communication band. Since the circuit components constituting the first receive circuit are separately arranged at the major surfaces 91a and 91b, it is possible to downsize the radio-frequency module 1A. As such, it is possible to provide the radio-frequency module 1A of a small size in which degradation of the isolation existing between the input and output paths of the receive filter 41 is suppressed.

Further, the matching circuit 31 and the antenna switch 20 may at least partially coincide with each other.

This configuration shortens the receive path connecting the antenna switch 20, the matching circuit 31, the receive filter 41, the matching circuit 51, and the low-noise amplifier 61. As a result, it is possible to reduce the communication loss of receive signal in the first receive circuit.

In the radio-frequency module 1, the matching circuit 31 may include the first inductor; the matching circuit 51 may include the second inductor; when the module substrate 91 is viewed in plan view, the first inductor and the antenna switch 20 may at least partially coincide with each other; and the second inductor and the low-noise amplifier 61 may at least partially coincide with each other.

When the matching circuit 31 and the matching circuit 51 are coupled to each other via an electromagnetic field, the intensity of magnetic-field coupling between the inductors is likely to be the highest. However, with the configuration described above, the first inductor and the second inductor are spaced apart from each other because of the receive filter 41, and as a result, it is possible to hinder magnetic-field coupling between the first inductor and the second inductor. As a result, it is possible to effectively suppress degradation of the isolation existing between the input and output paths of the receive filter 41.

Furthermore, the radio-frequency module 1 may further include the external connection terminals 150 arranged at the major surface 91b.

At the major surface 91b facing the external substrate, the matching circuit 31, the matching circuit 51, and the receive filter 41, which cannot be easily formed as low-profile structures, are not arranged; but the control circuit 70, the antenna switch 20, and the low-noise amplifier 61, which can be easily formed as low-profile structures, are arranged, and as a result, it is possible to form the entire radio-frequency module 1A as a low-profile structure.

In the radio-frequency module 1, the receive filter 41 may pass a signal in a receive band selected from LTE Band 7, Band 66, Band 25, and Band 30.

Moreover, the communication device 5 includes the antenna 2, the RFIC 3 configured to process a radio-frequency signal received by the antenna 2, and the radio-frequency module 1 configured to communicate the radio-frequency signal between the antenna 2 and the RFIC 3.

With this configuration, it is possible to provide the communication device 5 of a small size in which degradation of the isolation existing between the input and output paths of the receive filter 41 is suppressed.

Other Embodiments

While the radio-frequency module and communication device according to the embodiment of the present disclosure have been described above by using the embodiment and practical example, the radio-frequency module and communication device according to the present disclosure are not limited to the embodiment and practical example described above. The present disclosure also embraces other embodiments implemented as any combination of the constituent elements of the embodiment and practical example, other modified examples obtained by making various modifications that occur to those skilled in the art without departing from the scope of the embodiment and practical example described above, and various hardware devices including the radio-frequency module and communication device.

For example, in the radio-frequency module and communication device according to the embodiment and practical example described above, another circuit element or another wiring may be inserted between the circuit components or the paths connecting a signal path that are illustrated in the drawings.

The present disclosure can be widely used for communication devices such as mobile phones as a radio-frequency module configured to support multiple bands and to be provided in the front-end.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency module comprising:
   a module substrate having a first major surface and a second major surface on opposite sides of the module substrate;
   an antenna connection terminal;
   a receive filter;
   a low-noise amplifier;
   an antenna switch configured to control connection and disconnection between the antenna connection terminal and the receive filter;
   a first matching circuit coupled between an input terminal of the receive filter and the antenna switch;
   a second matching circuit coupled between an output terminal of the receive filter and the low-noise amplifier; and
   a control circuit configured to control at least one of the low-noise amplifier and the antenna switch, wherein
   the receive filter, the first matching circuit, and the second matching circuit are disposed on a first major surface-side of the module substrate,
   the low-noise amplifier, the antenna switch, and the control circuit are included in a semiconductor integrated circuit disposed on a second major surface-side of the module substrate, and
   from a plan view of the module substrate,
      the receive filter is positioned between the first matching circuit and the second matching circuit,
      the control circuit is positioned between the antenna switch and the low-noise amplifier, and
      respective footprints of the second matching circuit and the low-noise amplifier at least partially coincide with each other.

2. The radio-frequency module according to claim 1, wherein
   respective footprints of the first matching circuit and the antenna switch at least partially coincide with each other.

3. The radio-frequency module according to claim 2, wherein
   the first matching circuit includes a first inductor,
   the second matching circuit includes a second inductor, and
   from the plan view of the module substrate,
      respective footprints of the first inductor and the antenna switch at least partially coincide with each other, and
      respective footprints of the second inductor and the low-noise amplifier at least partially coincide with each other.

4. The radio-frequency module according to claim 1, further comprising:
   an external connection terminal disposed on the second major surface-side of the module substrate.

5. The radio-frequency module according to claim 2, further comprising:

an external connection terminal disposed on the second major surface-side of the module substrate.

6. The radio-frequency module according to claim 3, further comprising:
an external connection terminal disposed on the second major surface-side of the module substrate.

7. The radio-frequency module according to claim 1, wherein
the receive filter is configured to pass a receive signal in a receive band selected from Band 7, Band 66, Band 25, and Band 30 of Long Term Evolution (LTE).

8. The radio-frequency module according to claim 2, wherein
the receive filter is configured to pass a receive signal in a receive band selected from Band 7, Band 66, Band 25, and Band 30 of Long Term Evolution (LTE).

9. The radio-frequency module according to claim 3, wherein
the receive filter is configured to pass a receive signal in a receive band selected from Band 7, Band 66, Band 25, and Band 30 of Long Term Evolution (LTE).

10. The radio-frequency module according to claim 4, wherein
the receive filter is configured to pass a receive signal in a receive band selected from Band 7, Band 66, Band 25, and Band 30 of Long Term Evolution (LTE).

11. The radio-frequency module according to claim 5, wherein
the receive filter is configured to pass a receive signal in a receive band selected from Band 7, Band 66, Band 25, and Band 30 of Long Term Evolution (LTE).

12. The radio-frequency module according to claim 6, wherein
the receive filter is configured to pass a receive signal in a receive band selected from Band 7, Band 66, Band 25, and Band 30 of Long Term Evolution (LTE).

13. A communication device comprising:
an antenna;
a radio frequency signal processing circuit configured to process a radio-frequency signal received by the antenna; and
a radio-frequency module configured to communicate the radio-frequency signal between the antenna and the radio frequency signal processing circuit, the radio-frequency module including
a module substrate having a first major surface and a second major surface on opposite sides of the module substrate,
an antenna connection terminal,
a receive filter,
a low-noise amplifier,
an antenna switch configured to control connection and disconnection between the antenna connection terminal and the receive filter,
a first matching circuit coupled between an input terminal of the receive filter and the antenna switch,
a second matching circuit coupled between an output terminal of the receive filter and the low-noise amplifier, and
a control circuit configured to control at least one of the low-noise amplifier and the antenna switch, wherein
the receive filter, the first matching circuit, and the second matching circuit are disposed on a first major surface-side of the module substrate,
the low-noise amplifier, the antenna switch, and the control circuit are included in a semiconductor integrated circuit disposed on a second major surface-side of the module substrate, and
from a plan view of the module substrate,
the receive filter is positioned between the first matching circuit and the second matching circuit,
the control circuit is positioned between the antenna switch and the low-noise amplifier, and
respective footprints of the second matching circuit and the low-noise amplifier at least partially coincide with each other.

14. The communication device of claim 13, wherein
respective footprints of the first matching circuit and the antenna switch at least partially coincide with each other.

15. The communication device of claim 14, wherein
the first matching circuit includes a first inductor,
the second matching circuit includes a second inductor, and
from the plan view of the module substrate,
respective footprints of the first inductor and the antenna switch at least partially coincide with each other, and
respective footprints of the second inductor and the low-noise amplifier at least partially coincide with each other.

16. The communication device of claim 13, wherein the radio-frequency module further comprising:
an external connection terminal disposed on the second major surface-side of the module substrate.

17. The communication device of claim 14, wherein the radio-frequency module further comprising:
an external connection terminal disposed on the second major surface-side of the module substrate.

18. The communication device of claim 15, wherein the radio-frequency module further comprising:
an external connection terminal disposed on the second major surface-side of the module substrate.

19. The communication device of claim 13, wherein
the receive filter is configured to pass a receive signal in a receive band selected from Band 7, Band 66, Band 25, and Band 30 of Long Term Evolution (LTE).

20. The communication device of claim 14, wherein
the receive filter is configured to pass a receive signal in a receive band selected from Band 7, Band 66, Band 25, and Band 30 of Long Term Evolution (LTE).

* * * * *